(12) United States Patent
Yajima et al.

(10) Patent No.: US 12,526,037 B2
(45) Date of Patent: Jan. 13, 2026

(54) RELAY DEVICE

(71) Applicant: AmaterZ, Inc., Tokyo (JP)

(72) Inventors: Masakazu Yajima, Tokyo (JP);
Tamotsu Kiyakawauchi, Tokyo (JP);
Yoshiyuki Sekiguchi, Tokyo (JP);
Keita Otsuka, Tokyo (JP); Teruhisa Kamachi, Tokyo (JP); Hiroshi Tezuka, Tokyo (JP)

(73) Assignee: AMATERZ, INC., Tokyo (JP)

( * ) Notice: Subject to any disclaimer, the term of this patent is extended or adjusted under 35 U.S.C. 154(b) by 166 days.

(21) Appl. No.: 18/034,438

(22) PCT Filed: Oct. 28, 2021

(86) PCT No.: PCT/JP2021/039775
§ 371 (c)(1),
(2) Date: Apr. 28, 2023

(87) PCT Pub. No.: WO2022/092185
PCT Pub. Date: May 5, 2022

(65) Prior Publication Data
US 2023/0388003 A1    Nov. 30, 2023

(30) Foreign Application Priority Data

Oct. 29, 2020  (JP) ................................ 2020-181554

(51) Int. Cl.
*H04B 7/15* (2006.01)
*H04B 7/155* (2006.01)

(52) U.S. Cl.
CPC ..... *H04B 7/15521* (2013.01); *H04B 7/15592* (2013.01)

(58) Field of Classification Search
CPC ............ H04B 7/15521; H04B 7/15592; H04B 7/155; H04W 4/38; H04W 24/10; H04W 88/04; H04W 88/02; H04W 88/06
See application file for complete search history.

(56) References Cited

U.S. PATENT DOCUMENTS

2012/0155301 A1\* 6/2012 Miyazaki ................ H04L 43/00
370/252
2018/0083739 A1  3/2018 Kanayama et al.
(Continued)

FOREIGN PATENT DOCUMENTS

| JP | 2015-171075 A | 9/2015 |
| JP | 2017-108260 A | 6/2017 |
| JP | 2018-50186 A | 3/2018 |

OTHER PUBLICATIONS

International Search Report (PCT/ISA/210), issued in PCT/JP2021/039775, dated Jan. 25, 2022.

*Primary Examiner* — Hashim S Bhatti
(74) *Attorney, Agent, or Firm* — BIRCH, STEWART, KOLASCH & BIRCH, LLP

(57) ABSTRACT

A relay device 100 of the present invention comprises a receiver 101 for receiving data sent from a first communication device 10, 100 using first communication scheme, a first transmitter 104 for sending the data to a second communication device 11, 100 using the first communication scheme, and a second transmitter 105 for sending the data to a third communication device 12 using second communication scheme simultaneously or continuously with that the first transmitter sends the data, a communication distance of the second communication scheme being shorter than the first communication scheme.

16 Claims, 13 Drawing Sheets

(56) References Cited

U.S. PATENT DOCUMENTS

| | | | |
|---|---|---|---|
| 2018/0199172 A1* | 7/2018 | Boily | H04W 4/80 |
| 2018/0288093 A1* | 10/2018 | Kato | H04L 63/18 |
| 2020/0304967 A1* | 9/2020 | Kuriyama | H04W 4/38 |
| 2020/0359114 A1* | 11/2020 | Gokan | H04Q 9/00 |

* cited by examiner

RELAY DEVICE

CROSS REFERENCE TO RELATED APPLICATIONS

The present application is based on and claims the benefit of priority from Japanese Patent Application No. 2020-181554 filed on Oct. 29, 2020, the disclosure of which is incorporated herein by reference.

TECHNICAL FIELD

The present invention relates to a relay device which relays data sent from a communication device to another communication device.

BACKGROUND

A technique for collecting, storing, and utilizing various data by sending the data collected from afar using low-power and long-distance wireless communication scheme such as LPWA (Low Power Wide Area) and the like has been known in the past.

A relay device can be used to solve a problem which LPWA signal does not reach due to landform or obstacles.

For example, Patent Literature 1 discloses a relay device for relaying sensor data obtained by a wireless sensor terminal. The relay device disclosed in Patent Literature 1 comprises a long-distance and low-speed wireless communication unit, a middle-distance and high-speed wireless communication unit, and a short-distance and low-power wireless communication unit, either wireless communication unit transfers the sensor data obtained by the wireless sensor terminal to a data processing device.

PRIOR ART LITERATURE

Patent Literature

Patent Literature 1: JP2017-108260

SUMMARY OF THE INVENTION

When a relay device is installed, a measurement device which is equipped with the relay device itself or which is wired-connected to the relay device was used to check reception situation to select a proper location for relaying. However, such an installation method needs a dedicated measurement device or specialized knowledge for checking the reception situation.

It is an object of the present invention to realize a relay device which can be easily installed without any dedicated measurement device or specialized knowledge.

According to an embodiment of the disclosure, a relay device (100) comprises: a receiver (101) for receiving data sent from a first communication device (10, 100) using first communication scheme; a first transmitter (104) for sending the data to a second communication device (11, 100) using the first communication scheme; and a second transmitter (105) for sending the data to a third communication device (12) using second communication scheme simultaneously or continuously with that the first transmitter sends the data, a communication distance of the second communication scheme being shorter than the first communication scheme.

The numbers in parentheses attached to the claim elements of the present disclosure described in this section and claims indicate the relationship between the present invention and the embodiments described below, and are not intended to limit the present invention.

Advantageous Effects of Inventions

According to the invention, a person who does not have any dedicated measurement device or specialized knowledge can easily install a relay device.

DETAILED DESCRIPTION

Figure 1:
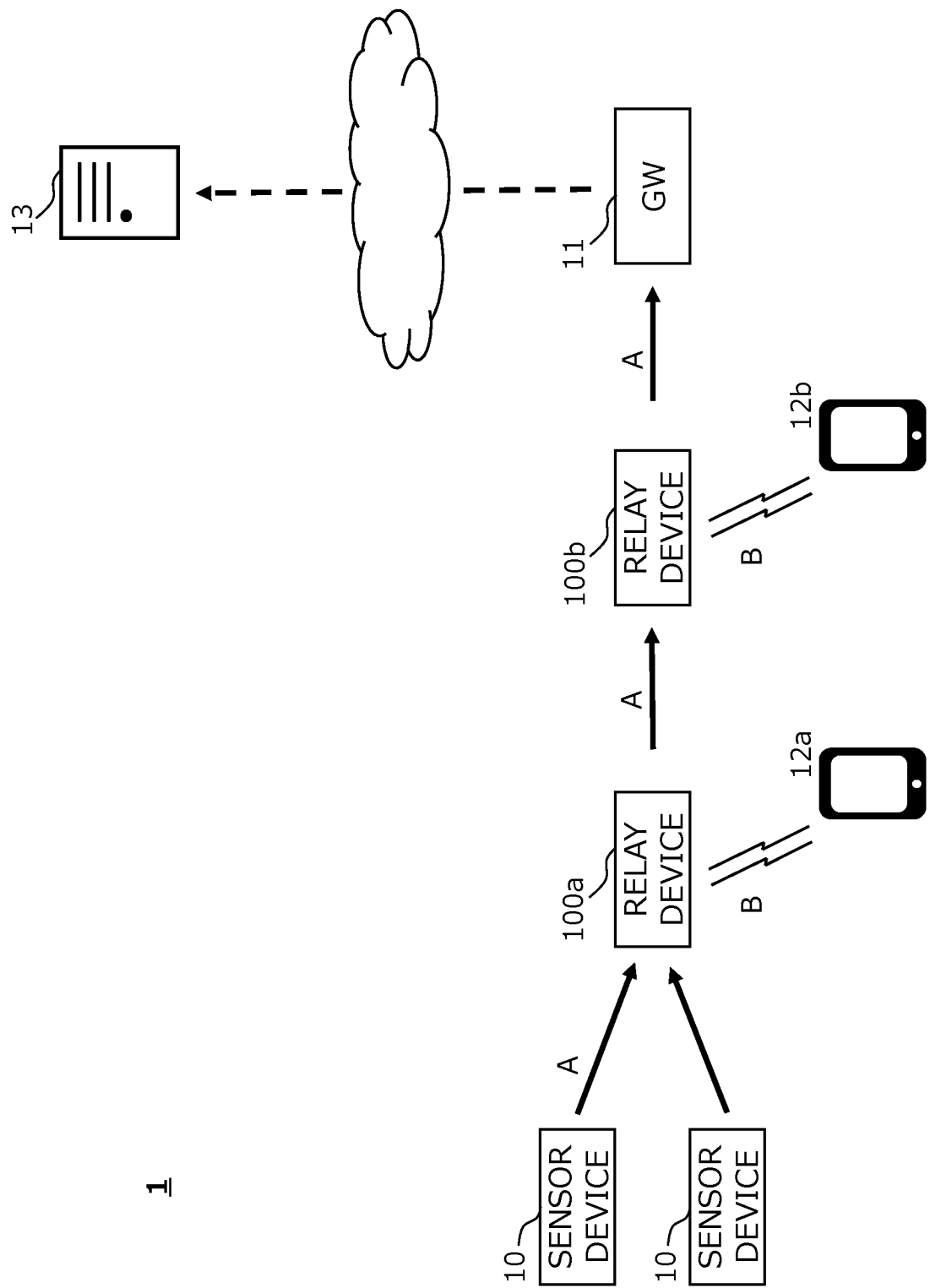
FIG. 1 is a diagram illustrating a communication system of a first embodiment.

Embodiments of the present invention will now be described with reference to the drawings.

Note that the present invention indicates any inventions in claims and not limited to the embodiments below. Further, at least words within the double quotation means words and phrases described in the claims and is not limited to the following embodiments.

Configurations and methods described in dependent claims of claims should be interpreted as arbitrary configurations and arbitrary methods in the invention of independent claims. Configurations and methods of following embodiments corresponding to configurations and methods described in dependent claims, and configurations and methods described only in the following embodiments without descriptions in claims should be interpreted as arbitrary configurations and arbitrary methods in the present invention. In a case that the scope of claims is broader than descriptions of the embodiments, configurations and methods described in the following embodiments are just examples of configurations and methods of the present invention, which should be interpreted as arbitrary configurations and arbitrary methods in the present invention. In any cases, essential configurations and methods of the present invention should be interpreted based on independent claims.

Any effects described in embodiments are effects obtained when a configuration of an embodiment as an example of this disclosure and are not necessarily an effect of the present invention.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

The problem described in this disclosure is not a publicly known problem, but person including the inventor has independently found out, and is a fact that affirms the inventive step of the invention together with the configuration and method of the present disclosure.

1. A Communication System 1 of the First Embodiment

An overview of a communication system 1 comprising a relay device 100 of the present embodiment will be described with reference to FIG. 1.

The communication system 1 comprises a relay device 100a, a relay device 100b, a sensor device 10, a gateway device (hereinafter referred to as GW) 11, a communication terminal device 12a, a communication terminal device 12b, and a server device 13. Configurations of each device will be described below. A general relay device including the relay device 100a and the relay device 100b will be described as relay device 100 and a general communication terminal device including the communication terminal device 12a and the communication terminal device 12b will be described as communication terminal device 12.

The relay device 100 and the sensor device 10, and the relay device 100 and the GW 11 communicate with each other using wireless communication scheme A (corresponding to "first communication scheme"). The wireless communication scheme A is long-distance wireless communication scheme whose communication distance is longer than wireless communication scheme B described below, and which communicates using broadband cellular communication called 3G, 4G, 5G or low-power and long-distance wireless communication (LPWA (Low Power Wide Area)) scheme which enables lower power consumption and long-distance communication. LPWA scheme is a communication scheme which mainly uses 800/900 MHz band called Sub-Giga band, which includes, but is not limited to, eMTC (enhanced Machine Type Communication) proposed by 3GPP (Third Generation Partnership Project), NB-IoT (Narrow Band Internet of Things) optimized to perform small data communication, SIGFOX™ developed by Sigfox, or LoRa™ developed by Semtech. PARCA™ which features broadcast typed bidirectional communication proposed by the present applicant may be used. The wireless communication scheme A is hereinafter referred to as long-distance wireless communication scheme.

The relay device 100 further communicates with the communication terminal device 12 using wireless communication scheme B (corresponding to "second wireless communication scheme"). The wireless communication scheme B is a communication scheme generally called short-distance wireless communication scheme whose communication distance is shorter than the wireless communication scheme A. The wireless communication scheme B is, for example, Wi-Fi™, ZigBee™, Bluetooth™ or Bluetooth Low Energy (BLE), Felica™, NFC (Near Field Communication), RFID and the like. The present embodiment uses BLE. The wireless communication scheme B is hereinafter referred to as short-distance wireless communication scheme.

Note that it may be sufficient for the wireless communication scheme A and the wireless communication scheme B to satisfy relative long and short relationship when those communication distances are compared. For example, Wi-Fi may be selected as the wireless communication scheme A and BLE may be selected as the wireless communication scheme B.

The GW 11 sends data received from the relay device 100 to the server device 13 via Internet. Although it is not shown in FIG. 1, users may access to the server device 13 using any general communication device such as Personal Computer (PC), smartphone, or cellphone and the like to use the data collected at the server device 13.

In the embodiments below, it is described that the sensor device 10 and the relay device 100 are different devices. However, the sensor device 10 and the relay device 100 may have the same configuration. That is, the sensor device 10 may have a feature as the relay device 100 described below, and the relay device 100 may have a feature as the sensor device 10 described below.

FIG. 1 shows a communication system in which two relay devices 100, the relay device 100a and the relay device 100b are provided between the sensor device 10 and the GW 11. However, the number of the relay device 100 in the communication system 1 of the present embodiment is arbitrary.

In the present embodiment, broadcast scheme which does not designate a recipient is adopted for a data sending method of the sensor device 10 and the relay device 100. The broadcast scheme enables to easily install the relay device because it is not necessary to determine a relay source or a relay destination among from a plurality of relay devices in advance. However, unicast scheme or multi-cast scheme which designates a recipient may be adopted.

2. Overview of Each Device Consisting of the Communication System 1

(1) Configuration of Sensor Device 10

The sensor device 10 has a sensing feature for measuring and obtaining data which indicates surrounding environment of a place where the sensor device 10 is located, and a communication feature for sending the obtained data using long-distance wireless communication scheme.

The sensor device 10 obtains data indicating surrounding environment at a predetermined time interval (for example, 1 hour, 30 minutes, etc.), and sends data including the data indicating the surrounding environment to the relay device 100 using long-distance wireless communication scheme. Below, the data indicating the surrounding environment obtained by the sensor device 10 is referred to as sensor data, and the sensor data and its additive data sent from the sensor device 10 to the relay device 100 is referred to as first data. Also, the data sent from the sensor device 10 is referred to as collected data.

Figure 2:
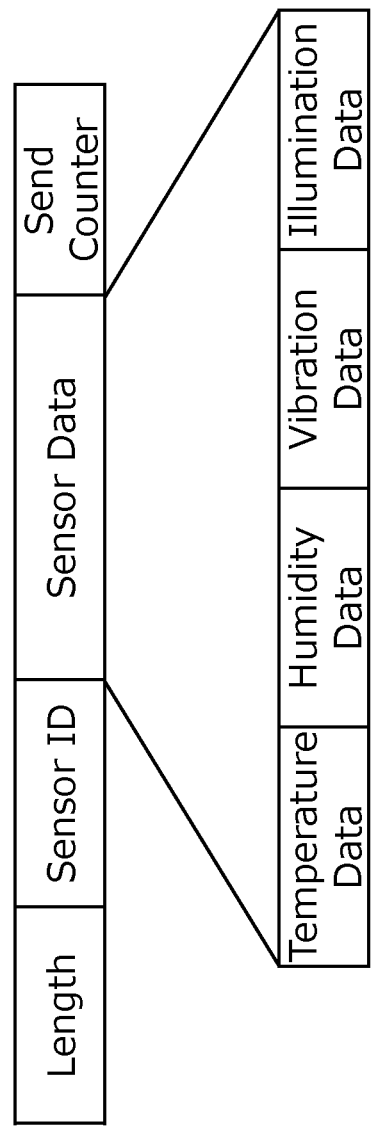
FIG. 2 is a diagram illustrating data format of collected data sent from a sensor device of the first embodiment.

FIG. 2 shows an example of data format of the collected data which is first data sent from the sensor device 10 to the relay device 100. In this example, the first data includes data length (Length), sensor device ID (Sensor ID) for identifying the sensor device 10 itself, sensor data (Sensor Data) obtained by the sensor device 10, and send counter data (Send Counter) indicating count number which the sensor device 10 sent the first data to the relay device 100 in the past. Location information of the sensor device 10 may be included in addition to the sensor device ID or instead of the sensor device ID.

In FIG. 2, temperature data, humidity data, vibration data, and illumination data are included as the sensor data. The temperature data is data indicating temperature detected by temperature sensor, humidity data is data indicating humidity detected by a humidity sensor, vibration data is data indicating amplitude or frequency detected by vibration sensors, and illumination data is data indicating light intensity detected by light sensors. Note that the vibration data may be an output from vibration power generation elements, and the illumination data may be an output from solar power elements. The vibration data and the illumination data may be measured values output at the time of measurement or may be accumulated values until the time of measurement.

The sensor data illustrated in FIG. 2 is an example and not limited to those. For example, it may be location information indicating a location of the sensor device 10. It may also be image information or voice information. The sensor data sent from the sensor device 10 to the relay device 100 may be plural or singular.

The sensor device 10 may be installed at any indoor or outdoor place to obtain the sensor data. For example, the sensor device 10 may be installed at farmland, grassland, or barn. When it is installed at paddy field, it can detect water level or sunshine hours as well as surrounding temperature and humidity. When it is installed at grassland or barn, it can detect movement of cattle as well as temperature and humidity. It may be, of course, directly installed at cattle. This enables users being farmers or cattle farmers to remotely monitor the condition of cattle by using the sensor data collected at the server device 13.

In another example, the sensor device 10 may be, for example, installed at river, pond or dam. When it is installed at river, it can detect water level and water velocity. This enables local government being a management body of river to remotely monitor the condition of river by using the sensor data collected at the server device 13. Furthermore, disaster such as flood may be predicted by using the sensor data.

In the present embodiment, the sensor device 10 is described as one device having both a sensor feature and a communication feature. However, the sensor device 10 of the present embodiment may be a combination of physically separated sensor and communication device. In this case, the sensor and the communication device are wired or wirelessly connected.

Also, the sensor device 10 may be any dedicated devices or any electronics mounting sensors such as smartphone, cellphone, tablet, smartwatch, smart-band, drone and the like.

(2) Configuration of Relay Device 100

The configuration of the relay device 100 (100*a*, 100*b*) of the present embodiment will be described using FIG. 3. The relay device 100 comprises a receiver 101, a data generator 102, an adder 103, a first transmitter 104, and a second transmitter 105. The data generator 102 includes an ID generator 106, a communication quality obtainer 107, and an increment part 108.

Figure 3:
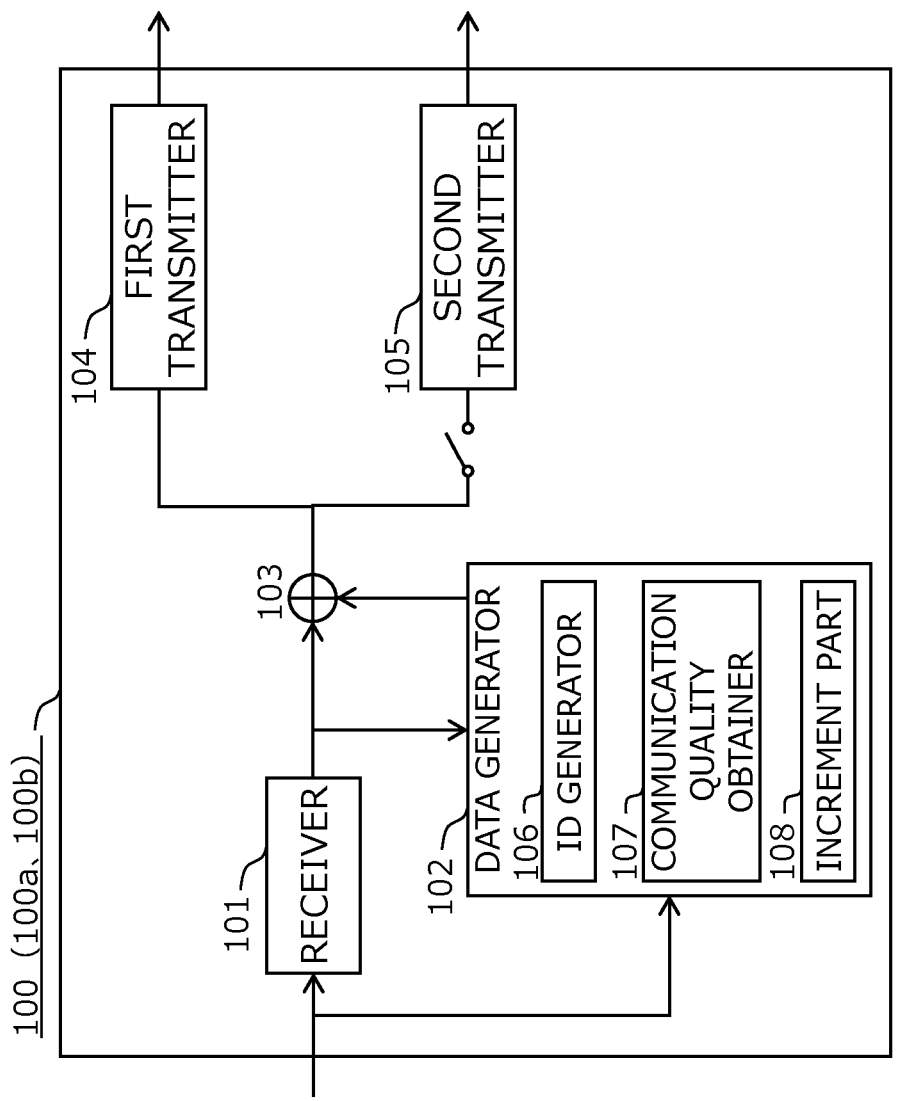
FIG. 3 is a block diagram illustrating a configuration of a relay device of the first embodiment.

The relay device 100*a* and the relay device 100*b* shown in FIG. 1 comprise the same configuration as illustrated in FIG. 3. However, the relay device 100*a* and the relay device 100*b* are slightly different in terms of the data received at the receiver 101 and the data generated at the data generator 102. Therefore, each of the relay device 100*a* and the relay device 100*b* will be described below.

(a) Relay Device 100*a*

The relay device 100*a* is a relay device for relaying data from the sensor device 10 to the relay device 100*b* described below.

The receiver 101 of the relay device 100*a* receives collected data consisting of first data sent from the sensor device 10 (corresponding to "first communication device") using long-distance wireless communication scheme.

When the receiver 101 receives the collected data consisting of the first data, the data generator 102 generates second data to output to the adder 103. Here, the data generator 102 may generate the second data by generating new data, or the data generator 102 may generate the second data by updating content of the first data included in the collected data received at the receiver 101. In the present embodiment, the data generator 102 generates the second data by performing three determinations and processes described below.

The ID generator 106 of the data generator 102 determines whether the relay device ID (Receiver ID) is included in the received collected data. In the present embodiment, because the relay device ID is not recorded in the received collected data, the ID generator 106 generates the relay device ID to identify the relay device 100*a*.

The communication quality obtainer 107 of the data generator 102 determines whether the collected data sent from the sensor device 10 is received or not. In the present embodiment, because the relay device 100*a* receives the collected data sent from the sensor device 10, the communication quality obtainer 107 obtains communication quality data by measuring quality of received signal of the collected data. The communication quality data may be obtained by measuring the quality at the communication quality obtainer 107 or obtained from the receiver 101 measuring it. The communication quality data is obtained, for example, by measuring RSSI (Received Signal Strength Indicator). The communication quality obtainer 107 may obtain RSRP (Reference Signal Received Power), RSRQ (Reference Signal Received Quality), SNR (signal to Noise Ratio), SIR (Signal to Interference power Ratio), BER (Bit Error Rate), or average bit rate per unit time (bps), instead of RSSI.

The increment part 108 of the data generator 102 generates relay count data indicating the number of relay times of the first data included in the collected data received at the receiver 101. In the present embodiment, the relay count data is not recorded in the first data because the receiver 101 of the relay device 100*a* directly receives the collected data from the sensor device 10. Accordingly, the increment part 108 generates the relay count data indicating the number of relay times [1].

The adder 103 adds the second data consisting of the relay device ID generated by the ID generator 106, the communication quality data obtained by the communication quality obtainer 107, and the relay count data generated by the increment part 108 to the first data included in the collected data received at the receiver 101 and outputs it.

Figure 4:
FIG. 4 is a diagram illustrating data format of transfer data sent from a relay device of the first embodiment.

FIG. 4 illustrates an example of data format of the transfer data consisting of the first data and the second data which is output from the adder 103 and sent from the first transmitter 104 and the second transmitter 105. In the data format illustrated in FIG. 4, in addition to the data format of the first data illustrated in FIG. 2, the relay device ID (Receiver ID), the communication quality data (RSSI), and the relay count data (Hopping Counter) are added. These data indicated by slant line correspond to the second data generated by the data generator 102.

The relay device ID (Receiver ID) is ID for specifying the relay device which firstly received the collected data from the sensor device 10. In the present embodiment, because the relay device 100*a* firstly receives the collected data from the sensor device 10, the relay device ID of the relay device 100*a* is recorded.

The communication quality data (RSSI) indicates the quality of the received signal of the collected data sent from the sensor device 10. In the present embodiment, RSSI being the communication quality data generated by the communication quality obtainer 107 is recorded.

The relay count data (Hopping Counter) indicates the number of relay times which the relay device relays the first data. In the present embodiment, because the relay device 100*a* receives the collected data and firstly relays the first data included in the collected data, the number of relay time [1] is recorded as the relay count data.

The first transmitter 104 sends the transfer data consisting of the first data and the second data which is output from the adder 103 to the relay device 100*b* (corresponding to "second communication device") using long-distance wireless communication scheme.

The second transmitter 105 sends the transfer data consisting of the first data and the second data which is output from the adder 103 to the communication terminal device 12*a* (corresponding to "third communication device") using short-distance wireless communication scheme, "simultaneously" or "continuously" with that the first transmitter 104 sends the transfer data consisting of the first data and the second data.

Here, "simultaneously" means that data sending process is performed at the same timing and the time when the data is actually sent is not necessary to be the same timing.

The "continuously" means that data sending process is continuously performed, and order of transmission is arbitrary.

(b) Relay Device 100*b*

The relay device 100*b* is a relay device for relaying data received from the relay device 100*a*. Here, the relay device 100*b* sends the data to the GW 11 in the example illustrated in FIG. 1, however, the relay device 100*b* may send the data to another relay device (not shown). The configuration of the relay device 100*b* is the same as the relay device 100*a*, and thus it will be described using FIG. 3.

The receiver 101 of the relay device 100*b* receives the transfer data consisting of the first data and the second data sent from the relay device 100*a* (corresponding to "first communication device") using long-distance wireless communication scheme.

When the receiver 101 receives the transfer data consisting of the first data and the second data, the data generator 102 generates new second data as necessary and outputs the generated second data to the adder 103. In the present embodiment, the data generator 102 generates the second data by performing three determinations and processes described below.

The ID generator 106 of the data generator 102 determines whether the relay device ID is included in the received transfer data. In the present embodiment, because the relay device ID of the relay device 100*a* has been already recorded in the second data included in the transfer data, the ID generator 106 does not newly generate the relay device ID of the relay device 100*b*.

The communication quality obtainer 107 of the data generator 102 determines whether the collected data sent from the sensor device 10 is received or not. In the present embodiment, because the receiver 101 receives not the collected data sent from the sensor device 10 but the transfer data, the communication quality obtainer 107 does not newly generate the communication quality data. Whether the data is the collected data sent from the sensor device 10 or not may be determined by, for example, whether the data corresponding to the second data is included or not.

The increment part 108 of the data generator 102 generates relay count data indicating the number of relay times of the first data included in the transfer data received at the receiver 101. In the present embodiment, because the number of relay time [1] is recorded in the relay count data (Hopping Counter) by the relay device 100*a*, the increment part 108 increments this to generate the relay count data indicating the number of relay times [2].

The adder 103 adds the second data generated by the data generator 102 to the transfer data received at the receiver 101 and outputs it. Specifically, the adder 103 overwrites the second data included in the transfer data received at the receiver 101 with the relay count data generated by the increment part 108 to update.

The first transmitter 104 sends the transfer data consisting of the first data and the second data output from the adder 103 to the GW 11 or any other relay devices (corresponding to "second communication device") using long-distance wireless communication scheme.

The second transmitter 105 sends the transfer data consisting of the first data and the second data output from the adder 103 to the communication terminal device 12*b* (corresponding to "third communication device") using short-distance wireless communication scheme "simultaneously" or "continuously" with that the first transmitter 104 sends the transfer data consisting of the first data and the second data.

(c) Common Features with Other Relay Devices 100

In the present embodiment, the data sent by the first transmitter 104 of the relay device 100 and the data sent by the second transmitter 105 are the same, however, the data sent by the second transmitter 105 may be a part of the data sent by the first transmitter. In this case, the part may be a part of types among types of the data included in the first data and the second data, or all types of the data included in the first data and the second data but a part of the number of the data included in the first data and the second data by thinning out. When a part of the data is sent, the part of the data corresponds to the "first data" and the "second data" of the present invention.

The relay device 100 may provide a switch with former stage or later stage of the second transmitter 105 to send the transfer data from the second transmitter 105 only when the switch is ON. By adopting such a configuration, the relay device 100 sends the relay data only from the first transmitter 104 under normal operation, and also sends the transfer data from the second transmitter 105 when installing the relay device 100.

In the present embodiment, each of the transfer data sent by the first transmitter 104 and the transfer data sent by the second transmitter 105 may be sent a plurality of times.

The reason why the first transmitter 104 sends the transfer data using long-distance wireless communication scheme is to upload the data to the server device 13 via the GW 11, therefore the number of transmission times of the transfer data may be less. On the other hand, the reason why the second transmitter 105 sends the transfer data using short-distance wireless communication scheme is to search a proper location for installing the relay device 100 using the communication terminal device 12, therefore the number of transmission times of the transfer data may be as more as possible.

Therefore, it is preferable that the number of transmission times which the second transmitter 105 sends the transfer data is more than the number of transmission times which the first transmitter 104 sends the transfer data. For example, the number of transmission times which the second transmitter 105 sends the transfer data may be 30-50 times, while the number of transmission times which the first transmitter 104 sends the transfer data may be 1-3 times.

Similarly, it is preferable that the transmission duration which the second transmitter 105 sends the transfer data is longer than the transmission duration which the first transmitter 104 sends the transfer data. For example, the transmission duration which the second transmitter 105 sends the transfer data may be three minutes, while the transmission duration which the first transmitter 104 sends the transfer data may be thirty seconds.

Similarly, it is preferable that the transmission cycle which the second transmitter 105 sends the transfer data is shorter than the transmission cycle which the first transmitter 104 sends the transfer data. For example, the transmission cycle which the second transmitter 105 sends the transfer data may be one second, while the transmission cycle which the first transmitter 104 sends the transfer data may be five seconds.

(3) Configuration of Communication Terminal Device 12

The communication terminal device 12 (12a, 12b) is a device with which an installer carries and operates when installing the relay device 100. In the embodiment described below, an example in which a general communication device such as smartphone, cellphone, tablet, personal computer (PC) is used as a communication terminal device 12 will be described.

Figure 5:
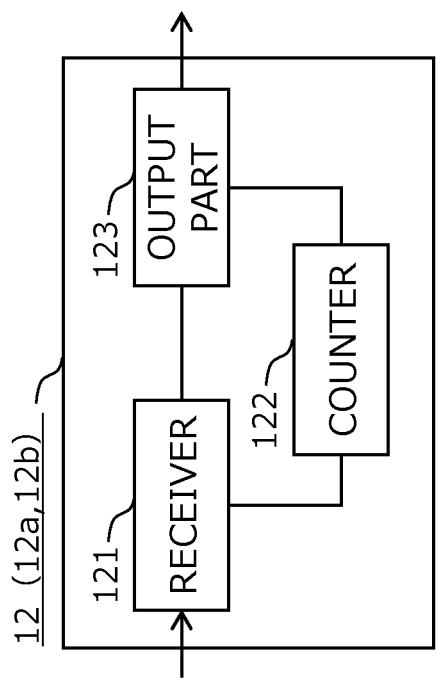
FIG. 5 is a block diagram illustrating a configuration of a communication terminal device of the first embodiment.

FIG. 5 shows a configuration of the communication terminal device 12. The communication terminal device 12 comprises a receiver 121, a counter 122, and an output part 123.

The receiver 121 receives the transfer data sent from the relay device 100 (100a, 100b) using short-distance wireless communication scheme.

The counter 122 counts the number of receiving times which the receiver 121 receives the relay data. In the present embodiment, the counter 122 counts the number of receiving times for each sensor device ID of the sensor device 10 included in the second data of the relay data. Otherwise, the counter 122 may count the number of receiving times for each relay device ID.

The output part 123 outputs all or part of the contents of the first data and the second data included in the relay data received at the receiver 121 by image or voice. The output part 123 may further output the number of receiving times counted by the counter 122.

The configuration described above can be realized by installing application on the communication terminal device 12. For example, the installer runs the application installed on the communication terminal device 12 when newly installing the relay device 100 or confirming the communication situation of the relay device 100 which has been already installed. When the application is run, the communication terminal device 12 starts the communication with the relay device 100 using short-distance wireless communication scheme and outputs necessary contents of the data from among the first data and the second data as well as the number of receiving times by image or voice.

Figure 6:
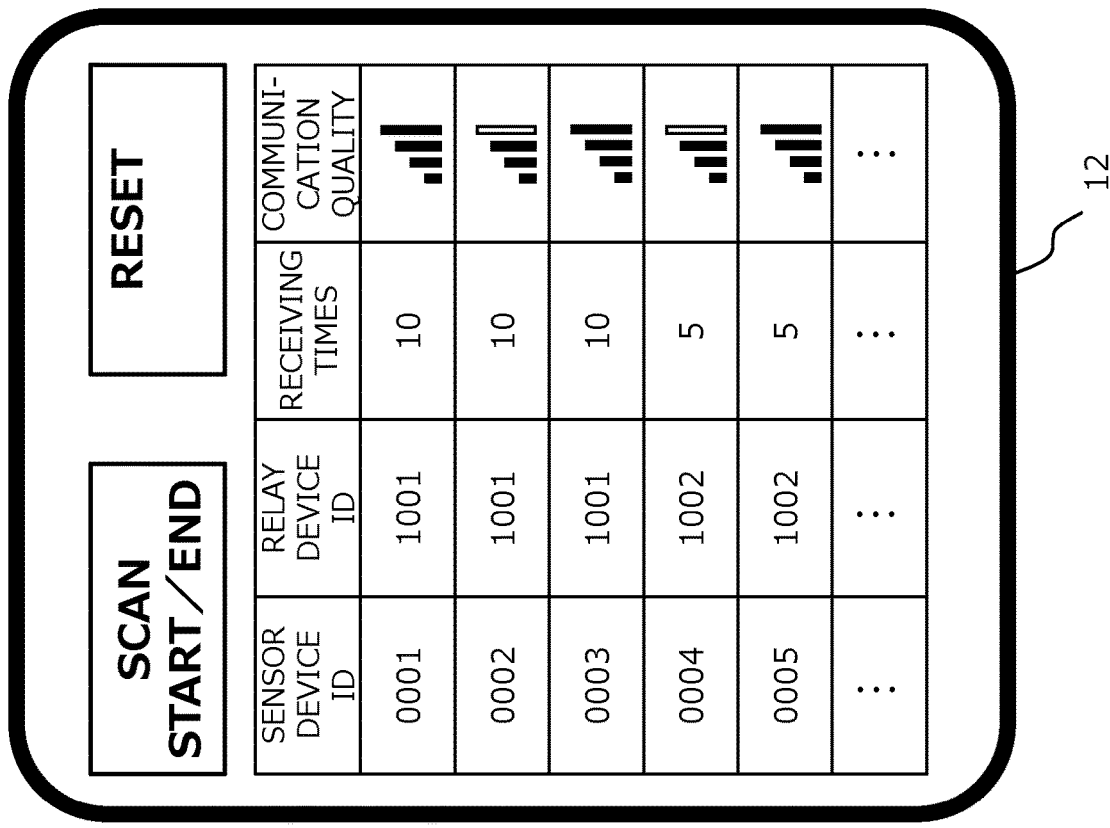
FIG. 6 is a diagram illustrating an image output to the communication terminal device of the first embodiment.

FIG. 6 illustrates an example of an image output from the output part 123 of the communication terminal device 12. In this example, sensor device ID, relay device ID, the number of receiving times, and communication quality are displayed.

The sensor device ID indicates a content of the sensor device ID (Sensor ID) illustrated in FIG. 2 and FIG. 4. The relay device ID indicates a content of the relay device ID (Receiver ID) illustrated in FIG. 4. The number of receiving times indicates the number of receiving the transfer data counted by the counter 122 for each sensor device ID. The communication quality indicates a content of communication quality data (RSSI) illustrated in FIG. 4.

It is preferable that a reset feature and a scan start/end feature is provided with the application which displays as illustrated in FIG. 6. The reset feature is a feature which deletes content of the transfer data previously processed by reset to output the transfer data received after reset from the output part 123. For example, this feature may be used when the relay device is moved to newly start measurement. The scan start/end feature is a feature which starts or finishes measurement without reset the data. Since the data is not reset, scan end corresponds to suspending the process, and the scan start corresponds to restart after the suspension.

(4) Installation Method of Relay Device 100 Using Communication Terminal Device 12

The installer may determine whether the installation location of the relay device 100 is proper or not based on the information output from the output part 123 of the communication terminal device 12. Specifically, the installer may search a proper installation location for the relay device, moving with the relay device 100 and confirming the information displayed on the smartphone.

The installer also understands the operation condition of the sensor device and the relay device 100 which have already been installed, using the communication terminal device 12. For example, when any buildings or any other facilities which affect radio wave environments are built after the sensor device 10 or the relay device 100 was installed, the data may not be collected at the server device 13 due to changes of the radio wave environment. Therefore, the installer can relocate the sensor device 10 and the relay device 100 to another proper location by confirming the content of the first data and the second data, which is sent from the sensor device 10 or the relay device 100, near the sensor device 10 or the relay device 100 which have been already installed.

Examples of use of the information output from the output part 123 will be described below. According to the sensor device ID, it can specify the sensor device 10 which can collect the collected data or the sensor device 10 which can transfer the collected data. For example, when the communication terminal device 12a outputs the transfer data of the relay device 100a as information, the installer can install the relay device 100a at a place where the collected data can be received from all or many of the installed sensor device 10. Also, when the communication terminal device 12b outputs the transfer data of the relay device 100b as information, the installer can confirm whether the collected data is directly received from the sensor device 10 without via the relay device 100a or not. When the collected data is directly received, by installing the relay device 100b in a direction away from the sensor device 10, the collection route of the collected data can be narrowed down to the route from the relay device 100a and thus the number of installing the relay device 100 can be reduced.

According to the relay device ID, the relay device 100 which firstly transfers the collected data of the sensor device 10 as the transfer data can be specified. For example, when the communication terminal device 12*b* outputs the transfer data of the relay device 100*b* as information, the installer can confirm whether the collecting network for the collected data is established or not based on the combination of the relay device ID and the sensor device ID.

According to the number of receiving times, the installer can confirm whether the relay device 100 continuously transfers the data or not. That is, he can confirm whether the sensor device 10 or the relay device 100 continuously transfers the collected data or the transfer data depending on increasing the number of the receiving times.

According to the communication quality, the installer can confirm reception environment of the collected data sent from the sensor device 10. That is, since he can confirm whether the relay device 100*a* is installed at a place where the collected data is surely received from the sensor device 10 or not, the relay device 100*a* can be installed at a place with a good communication quality. Also, when the communication quality is not improved, he can determine whether another relay device 100 should be added or not.

Note that the content output from the output part 123 of the communication terminal device 12 is not limited to the example illustrated in FIG. 6. For example, the output part 123 may output relay count data (Hopping Counter) or send count data (Send Counter) by image, in addition to each information shown in FIG. 6.

Furthermore, the content output from the output part 123 of the communication terminal device 12 is not limited to display the information included in the transfer data as it is. For example, it may be displayed by processing or connecting the information included in the transfer data with other information.

Figure 7:
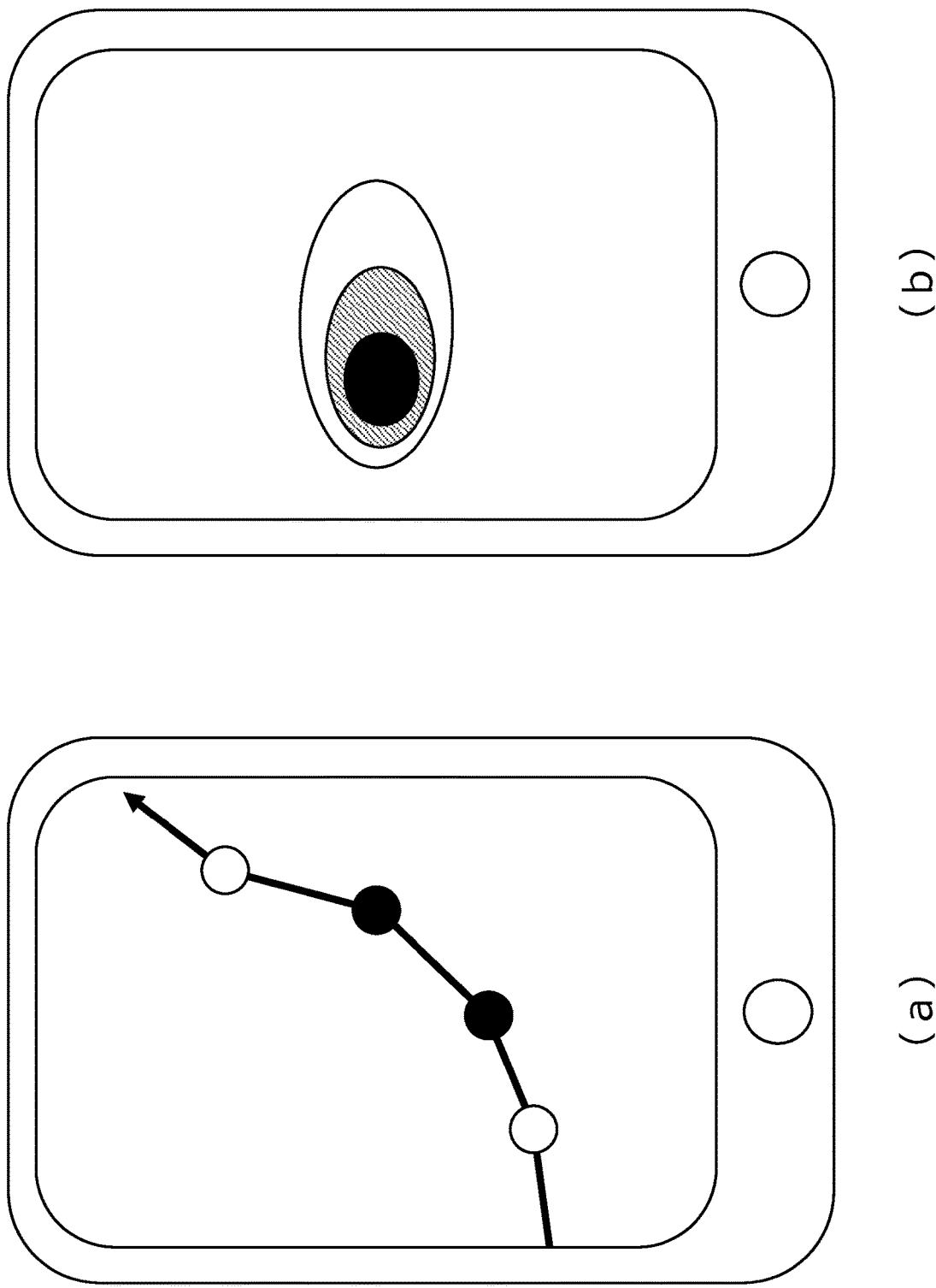
FIG. 7 is a diagram illustrating an image output to the communication terminal device of the first embodiment.

FIG. 7 illustrates an example of image output from the output part 123 of the communication terminal device 12. FIG. 7 (*a*) shows an example which displays the receiving situation of the signal from the sensor device 10 or other relay device 100 in connection with the location information on a map. The signal reception status uses the number of sensor device ID that can be received, the relay device ID that can be received, and the communication quality, or digitized, grouped or standardized value using the results of statistical process of those. The location information can be obtained by using GPS or gyro mounted on the communication terminal device 12. FIG. 7 (*a*) illustrates a proper location for installing the relay device 100 by distinguishing the area with reception better than the specified level and other areas.

FIG. 7 (*b*) illustrates areas with good reception step by step by applying statistical process to the information obtained by the method in FIG. 7(*a*).

(5) Other Devices

The GW 11 sends the transfer data sent from the relay device 100 to the server device 13 via Internet. Not shown in FIG. 1, however, the user may obtain and use the data by accessing the server device 13 using a general personal computer or mobile device. The GW 11 further sends the data sent from the server device 13 to the relay device 100 or the communication terminal device 12 using long-distance wireless communication scheme or short-distance wireless communication scheme. In this case, the GW 11 may comprise the same configuration as the relay device 100 in the present embodiment, or at least the first transmitter 104 and the second transmitter 105.

3. Operation of Communication System 1

Figure 8:
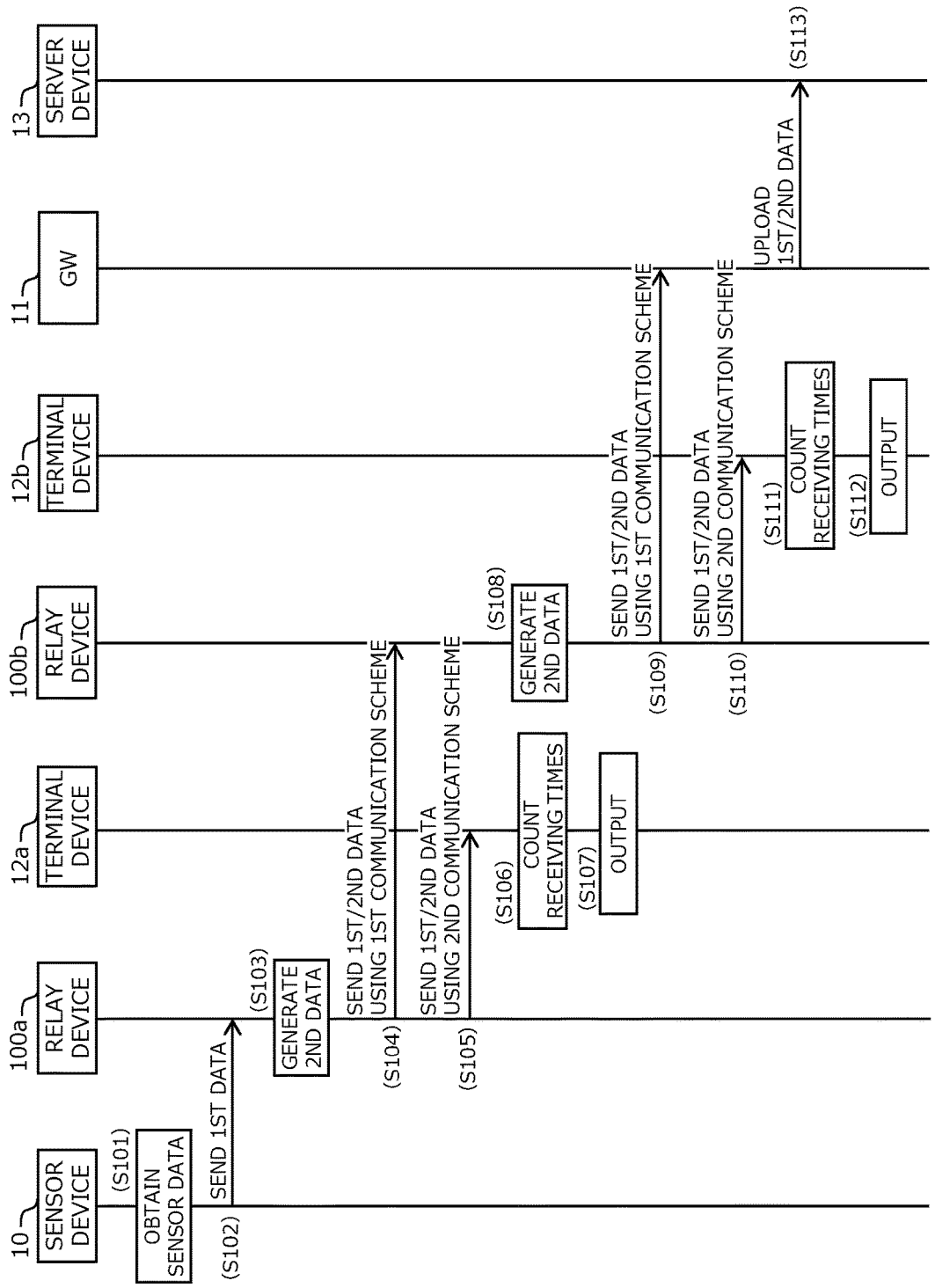
FIG. 8 is a diagram illustrating operations of the communication system of the first embodiment.

Next, the operation of whole communication system 1 will be described with reference to FIG. 8. The sensor device 10 obtains sensor data such as temperature data, humidity data and the like (S101). Next, the sensor device 10 sends the first data including the sensor data obtained in S101 as collected data to the relay device 100*a* using long-distance wireless communication scheme (S102).

When the relay device 100*a* receives the collected data from the sensor device 10, the data generator 102 generates second data (S103). Then, the relay device 100*a* sends the first data included in the received collected data and the second data generated in S103 as the transfer data to the relay device 100*b* using long-distance wireless communication scheme (S104). Simultaneously or continuously with this, the relay device 100*a* sends the first data included in the received collected data and the second data generated in S103 as the transfer data to the communication terminal device 12*a* using short-distance wireless communication scheme (S105).

When the communication terminal device 12*a* receives the transfer data consisting of the first data and the second data from the relay device 100*a*, counting the number of receiving the transfer data (S106). Then, the communication terminal device 12*a* outputs the first data and the second data included in the received transfer data and the number of receiving of the transfer data by image or voice (S107).

When the relay device 100*b* receives the transfer data consisting of the first data and the second data from the relay device 100*a*, newly generating the second data (S108). Then, the relay device 100*b* sends the received first data and the second data generated in S108 as the transfer data to the GW 11 using long-distance wireless communication scheme (S109). Simultaneously or continuously with this, the relay device 100*b* sends the received first data and the second data generated in S108 as the transfer data to the communication terminal device 12*b* using short-distance wireless communication scheme (S110).

Similar to the communication terminal device 12*a*, when the communication terminal device 12*b* receives the transfer data consisting of the first data and the second data from the relay device 100*b*, counting the number of receiving the transfer data (S111). Then, the communication terminal device 12*b* outputs the first data included and the second data in the received transfer data, and the number of receiving the transfer data by image or voice (S112).

On the other hand, the GW 11 uploads the transfer data to the server device 13 when receiving the transfer data consisting of the first data and the second data from the relay device 100*b* (S113).

Note that the example in which two relay devices 100 (100*a*, 100*b*) are provided between the sensor device 10 and the GW 11 in the embodiment above, however, the number of the relay device 100 is arbitrary.

Furthermore, similar to the relay device 100, the sensor device 10 may also send the collected data using short-distance wireless communication scheme, in addition to sending the collected data consisting of the first data using long-distance wireless communication scheme. The installer can install the sensor device 10 at a proper location using the communication terminal device 12, by the sensor device 10 sending the collected data using long-distance wireless communication scheme and short-distance wireless communication scheme.

4. Summary of Embodiment

As described above, according to the present embodiment, the relay device 100 sends data received from a communication device which is the sensor device 10 or the relay device 100, using two communication schemes having different communication distances. The data sent using communication scheme having shorter communication distance among two communication schemes is sent to the communication terminal device and it will be notified to the installer. Therefore, the installer can determine whether the installation location of the relay device is proper location for relaying the data or not.

5. Modification (1) Relay Device ID

In the embodiment above, the ID generator 106 determines whether the relay device ID (Receiver ID) is included in the received collected data, and generates the relay device ID when the relay device ID is not recorded or does not generate the relay device ID when the relay device ID is recorded. In such an operation, the relay device ID included in the second data of the transfer data indicates the relay device 100a which firstly receives the collected data from the sensor device 10. This information has a meaning as location information in that the sensor device 10 and the relay device 100a communicate each other as well as the location of the sensor device 10 is within a certain area based on the relay device 100a.

However, instead of this, the ID generator 106 may generate the relay device ID regardless of the content of the received collected data. In such an operation, the relay device ID indicates the relay device 100 which transfers most recently. This information indicates from which relay device 100 the received transfer data is sent, which enables to confirm rough communication path of the transfer data.

Further, instead of this, the ID generator 106 may generate the relay device ID regardless of the content of the received collected data, and the adder 103 adds the generated relay device ID without overwriting. In such an operation, the relay device ID indicates communication path starting from the sensor device 10.

(2) Communication Quality Data

In the embodiment above, the communication quality obtainer 107 determines whether the collected data sent from the sensor device 10 is received or not, and obtains communication quality data when the collected data is received.

Instead of this, the communication quality obtainer 107 may obtain communication quality data of the received collected data or the transfer data regardless of whether the received data is the collected data or the transfer data. In such an operation, the communication quality data indicates reception environment of the relay device. By using this information, the relay device 100 can be installed at a location where the communication quality data indicates good reception environment.

(3) Location Information

The data generator 102 may generate location information which indicates the location of the relay device 100 and the information may be included in the second data. In this case, the data generator 102 may overwrite or add the information, in connection with the relay device ID described (1) above.

6. Application Examples (1) Pseudo Relay Device

In the embodiment above, it is assumed that the installer searches the best installation location based on the information displayed on the communication terminal device 12, moving with the relay device 100. However, it is not necessary to move the relay device 100 to be actually installed, and the best installation location may be searched based on the information output from the communication terminal device 12 by moving a pseudo relay device 200 having the same feature as the relay device 100.

Figure 9:
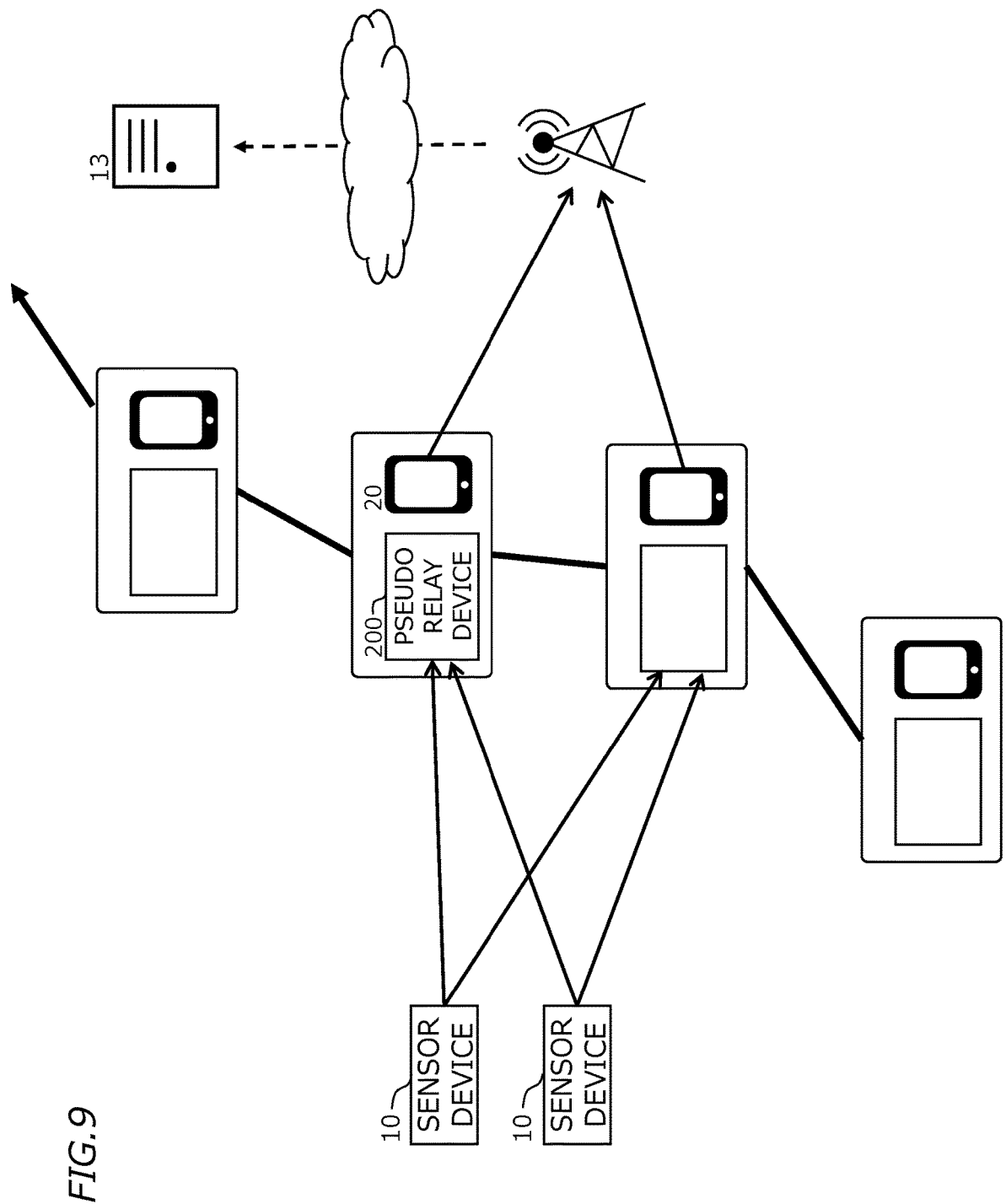
FIG. 9 is a diagram illustrating an application example of the communication system of the first embodiment.

An overview of a communication system 2 of an application example will be described using FIG. 9. Since the pseudo relay device 200 comprises the same configuration as the above embodiment, the descriptions of the embodiment above will be referred.

The communication terminal device 20 comprising the same configuration as the communication terminal device 12 receives the transfer data sent from the pseudo relay device 200 using short-distance wireless communication scheme. The communication terminal device 20 further comprises a wireless communication unit for long-distance wireless communication and a location information obtainer. An example of long-distance wireless communication is wideband cellular communication called 3G, 4G, or 5G, but any other scheme may be used. Other communication scheme which allows longer distance communication such as satellite cellphone may be also used.

The pseudo relay device 200 and the communication terminal device 20 are mounted on a movable body. An example of the movable body is, for example, human, vehicle, motorcycle, ship, drone, helicopter, and airplane. Here, an example which the devices are mounted on a drone to relay the collected data of the sensor device 10 installed in forest will be described.

The drone on which mounting the pseudo relay device 200 and the communication terminal device 20 flies over forest. When the pseudo relay device 200 mounted on the drone receives the collected data sent from the sensor device the pseudo relay device 200 sends the transfer data from the first transmitter 104 and the second transmitter 105.

The communication terminal device 20 mounted on the drone receives the transfer data. Then, the device sends the transfer data with location information obtained by the location information obtainer at a location where the device received the transfer data, using long-distance wireless communication. The location information and the transfer data which are sent are stored at the server device 13 via a base station and cloud. When the communication terminal device cannot communicate with the base station, the data may be stored in a memory provided with the communication terminal device 20 and be sent to the base station when the device can communicate with the base station. Otherwise, the location information and the transfer data stored in the memory of the communication terminal device 20 may be taken out after the drone returns.

The transfer data sent from the first transmitter 104 of the pseudo relay device 200 may be used to confirm whether another relay device 100 which has been already installed or another movable body having similar pseudo relay device 200 can receive signal at the same time or not, that is, to confirm whether it can relay or not. For example, the pseudo relay device 200 mounted on the drone receives the data of the sensor device 10, the first transmitter 104 sends the transfer data, and another pseudo relay device 200 mounted on a vehicle located away from the drone confirms whether it can receive the transfer data from the flying drone. Using a plurality of the pseudo relay devices 200 at the same time and calculating reception area of the collected data and the transfer data enables to generate a map of subject area for indicating a place where the relay device 100 can be effectively installed and to optimize the installation location of the relay device 100. For example, by mounting the pseudo relay device 200 on a movable body such as drones which can autonomously operate and whose physical movement is not limited, it can shorten a time for determining the installation location of the relay device 100, even if it is necessary for person to take time to get to a place where the relay device 100 to be installed. It may be automatically performed to determine the installation location of the relay device 100. Note that the sensor device 10 is not always necessary when determining the installation location of the relay device 100. Similar to the pseudo relay device 200, the sensor device 10 may be also placed at a pseudo installation location. The sensor device may be also mounted on another drone.

The location information and the transfer data stored at the server device 13 is, for example, output using a method illustrated in FIG. 7. Then, the relay device 100 can be installed at a suitable place to install the relay device 100.

Using such pseudo relay device 200 with a movable body enables to search a place where people cannot easily enter such as mountain or sea. The pseudo relay device 200 and the communication terminal device 20 are mounted on a vehicle and search a place while moving on road, which enables to effectively search a suitable place to install the relay device 100. For example, the pseudo relay device 200 and the communication terminal device 20 mounted on the vehicle can search a place where the device can receive the collected data sent from the sensor device 10 installed at a gas maintenance hole.

Using such pseudo relay device 200 with a movable body enables to search a missing person on mountain or sea. For example, if a missing person holds a terminal device corresponding to the sensor device 10, it is possible to search the person by flying a drone mounting the pseudo relay device 200 around the place where the person was missed.

(2) Other Installation Method of Relay Device 100

In the embodiment above, it is assumed to install the relay device 100 on the premise that the sensor device 10 is installed in advance. However, the relay device 100 of the present embodiment can be installed even when the sensor device 10 is not installed in advance.

Figure 10:
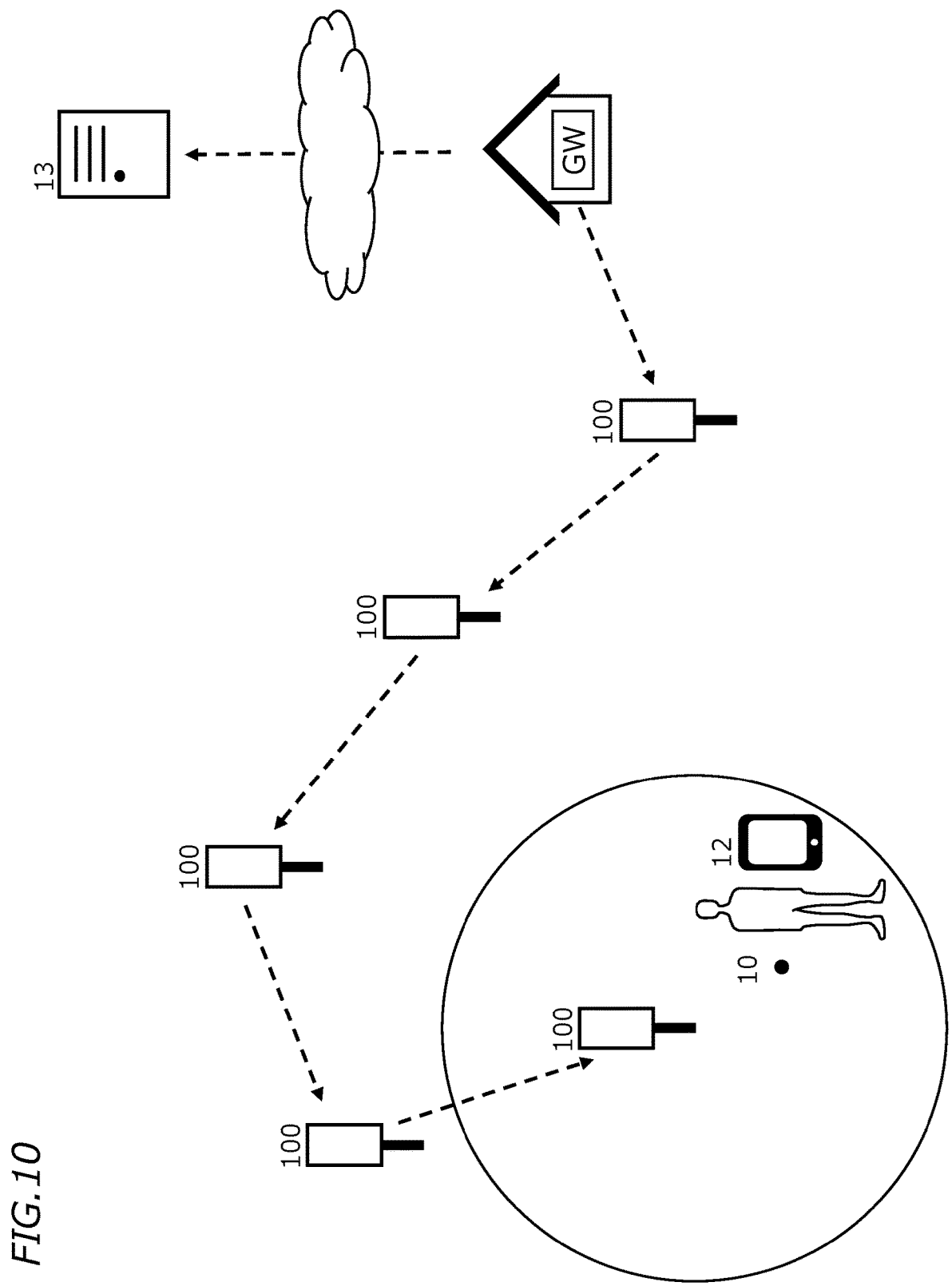
FIG. 10 is a diagram illustrating an application example of installation method of the relay device of the first embodiment.

FIG. 10 is a diagram illustrating a method for installing the relay device 100. This method assumes that, for example, the relay device 100 is installed for watching workers who work in forest.

Firstly, the GW 11 is installed. For example, it is preferable to be installed at a place where electricity is secured such as work shed. The GW11 is connected to the serve device 13 and has a feature to send dummy data.

The worker holds a plurality of the relay device 100 and the communication terminal device 12. The worker also wears a smart band on his arm as the sensor device 10. He confirms the output of the communication terminal device 12 while moving into the forest and installs the relay device 100a at a place where the device can receive the dummy data sent from the GW11.

The worker further enters into the forest confirming the output from the communication terminal device 12 and installs the relay device 100b at a place where the device can receive dummy data transferred from the relay device 100a which has been already installed. In this way, the relay device 100b will be sequentially installed until arriving at the subject work area.

Then, the last relay device 100b is installed at the center of the subject work area. The worker starts work, turning the smart band ON. The smart band comprises sensors such as GPS, thermometer, pulse meter, or acceleration sensor and the like. The sensor data is sent to the server device 13 via the relay device 100 and the GW 11.

By installing the relay device 100 on the route to the work area in this way, it is possible to watch over the workers even at a place where it is difficult for mobile phone signal to reach. For example, by monitoring the sensor data, it can detect deviation of temperature or pulse. It may also detect the movement of workers based on the location information sent from GPS. It may further detect any other unusual situation such as falling down or dropping based on acceleration information sent from acceleration sensor. Furthermore, in addition to the sensor data, the worker may send SOS signal to notify his health problem.

Note that the communication terminal device 12 such as smartphone may be used as the sensor device 10 instead of smart band.

The installation interval of the relay device 100 may be an interval which the signal can be received using long-distance wireless communication scheme or an interval which the signal can be received using short-distance wireless communication scheme. Installing the relay device 100 with such intervals enables to relay the sensor data using a plurality of communication schemes, and thus the sensor data can be more surely sent.

7. Communication System 2 and Relay Device 200 in Second Embodiment

The relay device 100 in the present embodiment comprises two transmitters, the first transmitter 104 and the second transmitter 105, however, only comprises the receiver 101 for receiving data sent using long-distance wireless communication scheme as a receiver. The relay device 200 of the present embodiment comprises a first receiver 101 for receiving data using long-distance wireless communication scheme and a second receiver 109 for receiving data sent using short-distance wireless communication scheme.

Figure 11:
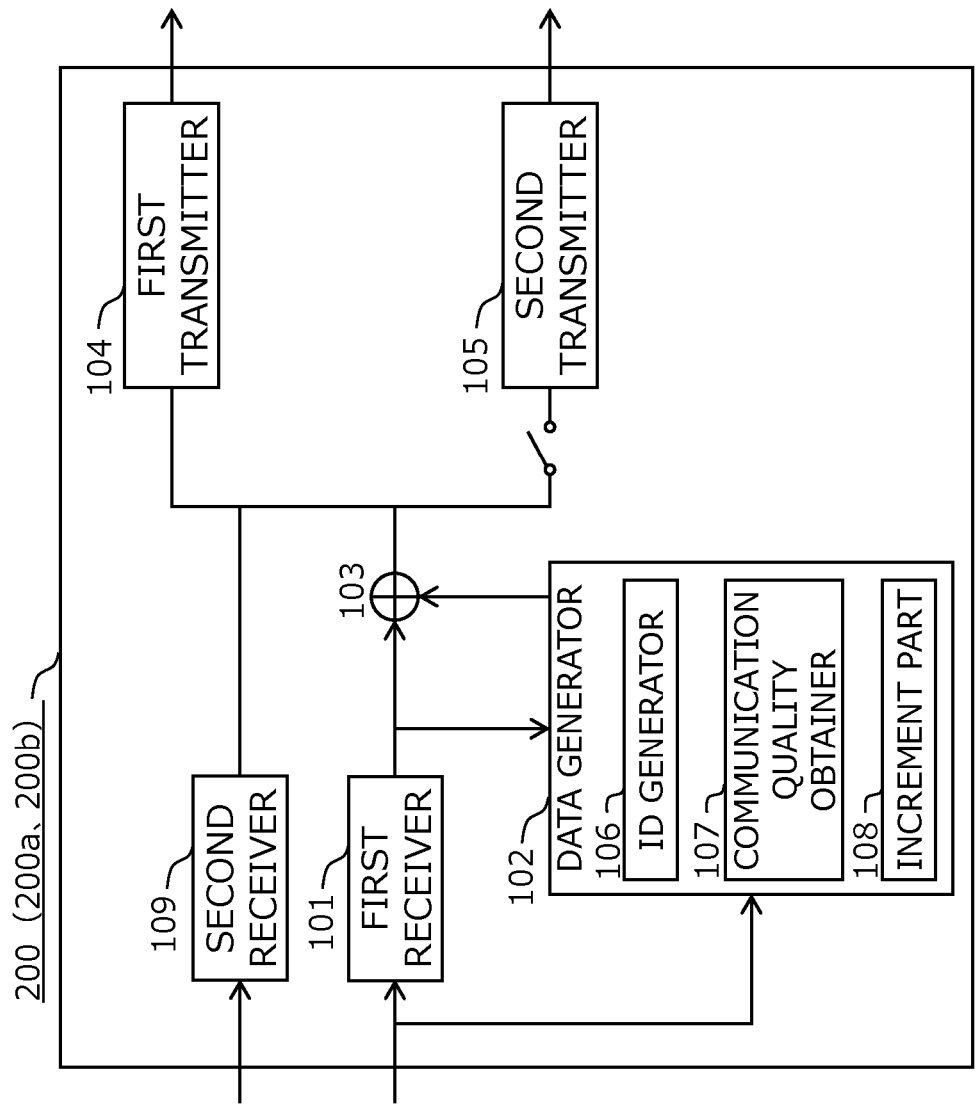
FIG. 11 is a block diagram illustrating a configuration of a relay device of the second embodiment.

FIG. 11 illustrates the configuration of the relay device 200. It should be noted that the same numerical reference as the relay device 100 of FIG. 3 will be used and the descriptions for FIG. 3 will be referred for configurations common to the relay device 100 of FIG. 3.

The second receiver 109 receives data sent from the communication terminal device 12 (corresponding to "fourth communication device") using short-distance wireless communication scheme (corresponding to "second communication scheme").

The data received at the second receiver 109 will be sent from the first transmitter 104 and the second transmitter 105 using each of communication scheme.

Figure 12:
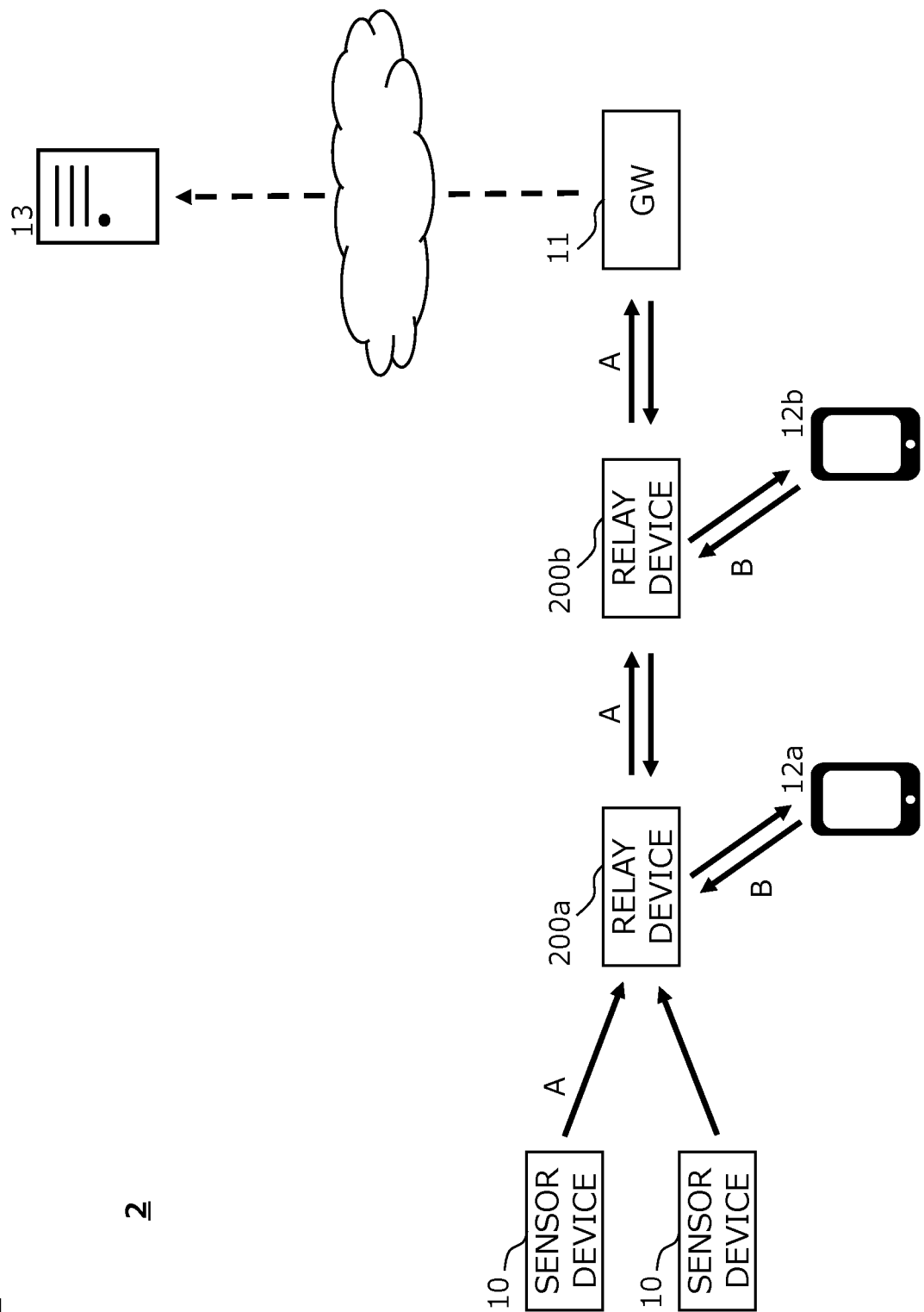
FIG. 12 is a diagram illustrating a communication system of the second embodiment.

Using the relay device 200 having such configuration, the relay device 200 can perform upstream/downstream bidirectional communication with the communication terminal device 12. For example, in the communication system 2 in FIG. 12, the communication terminal device 12b can receive the data sent from the communication terminal device 12a via the relay device 200a and the relay device 200b. On the contrary, the communication terminal device 12a can receive the data sent from the communication terminal device 12b via the relay device 200b and the relay device 200a.

Figure 13:
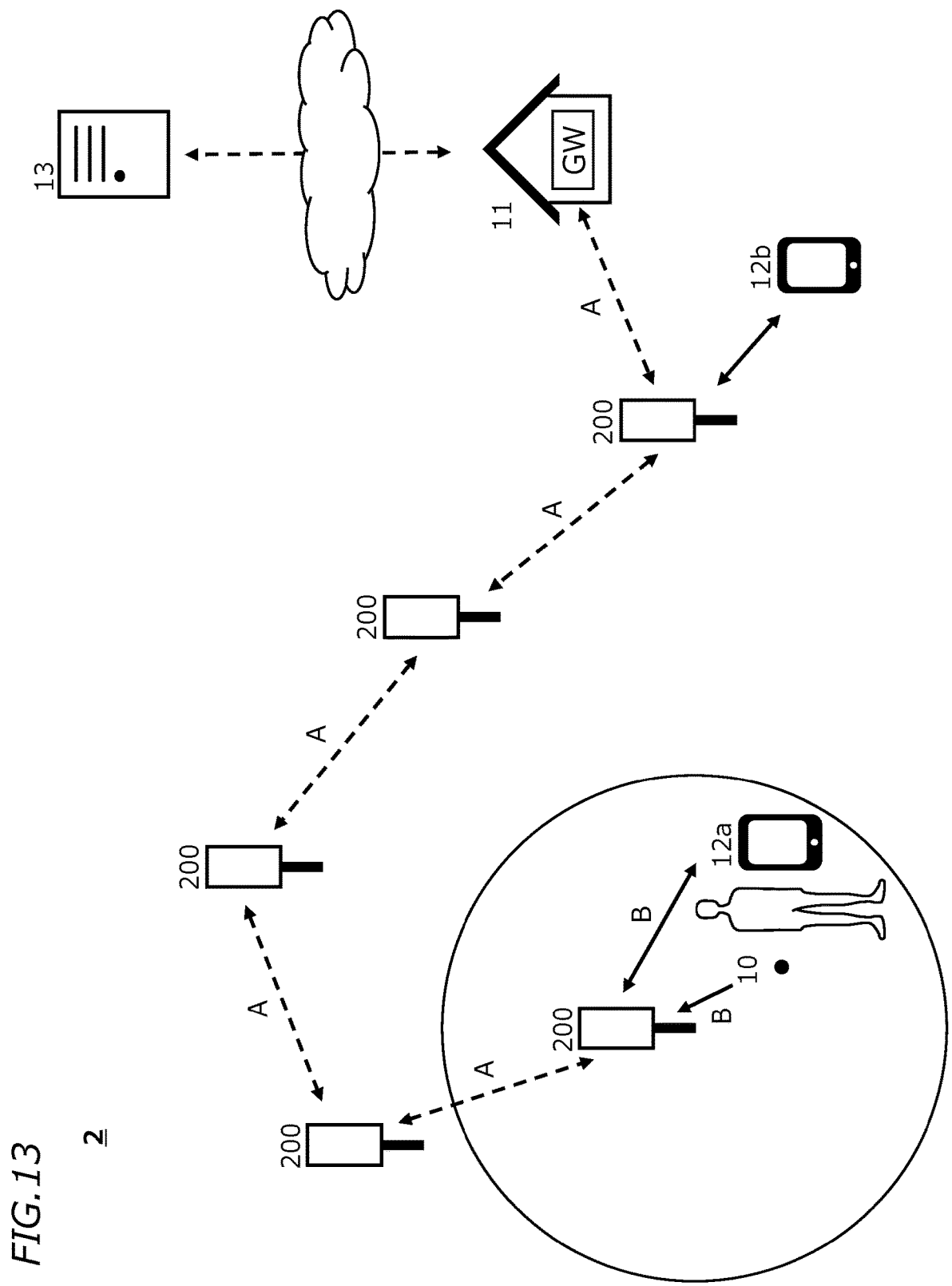
FIG. 13 is a diagram illustrating an example of use of the communication system of the second embodiment.

Similar to the application example of the first embodiment, such communication system 2 can be used for watching over workers. In FIG. 13, the smart band 10 and the communication terminal device 12a hold by the worker corresponds to short-distance wireless communication scheme. The smart band 10 or the communication terminal device 12a comprises sensors such as GPS, thermometer, pulse meter, acceleration sensor and the like. The smart band 10 or the communication terminal device 12a can send SOS signal for the worker to notify his health problem.

For example, when the worker sends SOS signal from the communication terminal device 12a, the SOS signal is transferred to the server device 13 via the relay device 200 and the GW 11, and the server device 13 will report. In addition to that, when other worker exists in an area covered by the communication system 2, the signal is also transferred to the communication terminal devices 12b hold by other workers. Therefore, other workers can rush to rescue the worker.

In this example, an example in which the sent data is SOS signal is described, however, the condition of workers can be watched over by using location information sent from GPS and acceleration information sent from acceleration sensor provided with the smart band 10 or the communication terminal device 12a.

In the present embodiment, the data sent from the first transmitter 104 and the data sent from the second transmitter 105 of the relay device 200 may be sent a plurality of times.

The reason why the first transmitter 104 sends the data using long-distance wireless communication scheme is to upload the data to the server device 13 via the GW11, therefore the number of transmission times of the transfer data may be less. On the other hand, the reason why the second transmitter 105 sends the data using short-distance wireless communication scheme is to notify unusual situation to other workers in the area covered by the communication system 2, therefore the number of transmission times of the transfer data may be as more as possible.

Therefore, it is preferable that the number of transmission times which the second transmitter 105 sends the data is more than the number of transmission times which the first transmitter 104 sends the data.

Similarly, it is preferable that the transmission duration which the second transmitter 105 sends the data is longer than the transmission duration which the first transmitter 104 sends the data. Preferably, it continues to send the data until receiving a response from the communication terminal device 12b.

Similarly, it is preferable that the transmission cycle which the second transmitter 105 sends the data is shorter than the transmission cycle which the first transmitter 104 sends the data.

In this way, by constructing the communication system 2 using the relay device 200, a network enabling interactive communication in an area covered by communication system 2 can be constructed.

8. Recapitulation

The Features of the relay device and the communication terminal device communicating with the relay device in each of the embodiments of the present invention have been described above.

Since the terms used in each embodiment are examples, the terms may be replaced with terms that are synonymous or include synonymous functions.

The block diagram used for the description of the embodiment is obtained by classifying and arranging the configurations of the device for each of the functions. Individual function blocks may be implemented by arbitrarily combining hardware and software. Further, since the block diagram illustrates functions, the block diagram can be understood as disclosure of a method and a program that implements the method.

Function blocks that can be understood as processes, flows, and methods described in the respective embodiments may be changed in order as long as there is no restrictions such as a relationship in which results of preceding other steps are used in one step.

The terms such as first, second, to N-th (where N is an integer) used in each of the embodiments and in the claims are used to distinguish two or more configurations and methods of the same kind and are not intended to limit the order or superiority.

INDUSTRIAL APPLICABILITY

A communication system including a relay device of the present embodiment can be used for searching missing person and monitoring or watching over farmers as well as agriculture or river management.

What is claimed is:

1. A relay device, comprising:
   a receiver receiving data sent from a first communication device using first communication scheme;
   a first transmitter sending the data to a second communication device using the first communication scheme; and
   a second transmitter sending the data to a third communication device using second communication scheme simultaneously or continuously with that the first transmitter sends the data, a communication distance of the second communication scheme being shorter than the first communication scheme.

2. The relay device according to claim 1, wherein
   the first transmitter and the second transmitter send the data a plurality of times; and
   the number of transmission times which the second transmitter sends the data is more than the number of transmission times which the first transmitter sends the data.

3. The relay device according to claim 1, wherein
   the first transmitter and the second transmitter send the data a plurality of times; and
   a transmission duration which the second transmitter sends the data is longer than a transmission duration which the first transmitter sends the data.

4. The relay device according to claim 1, wherein
   the first transmitter and the second transmitter send the data a plurality of times; and
   a transmission cycle which the second transmitter sends the data is shorter than a transmission cycle which the first transmitter sends the data.

5. The relay device according to claim 1, wherein
   the data includes location information or acceleration information of the first communication device.

6. The relay device according to claim 1,
   the relay device obtains communication quality data between the relay device and the first communication device, and wherein the first communication device is a sensor device, and wherein the first transmitter and the second transmitter send first data as the data and second data indicating the obtained communication quality data.

7. The relay device according to claim 1, wherein at least one of the first communication device and the second communication device is a second relay device which is different from a first relay device being the relay device; and the first transmitter and the second transmitter send first data being the data and second data which is relay count data indicating the number of relay times of the first data.

8. The relay device according to claim 1, wherein the relay device and the third communication device are mounted on a movable body.

9. The relay device according to claim 1 further comprising:

a first receiver being the receiver and a second receiver receiving data sent from a fourth communication device using the second communication scheme.

10. The relay device according to claim 9, wherein the data includes location information or acceleration information of the fourth communication device.

11. The relay device according to claim 1, wherein the second transmitter sends the data to the third communication device that includes an output part outputting the data by image or voice.

12. The relay device according to claim 11, wherein the second transmitter sends the data to the third communication device that further includes a counter counting receiving times which the data is received from the relay device; and the output part further outputs the receiving times.

13. The relay device according to claim 11, wherein the second transmitter sends the data to a smartphone or a cellphone as the third communication device.

14. The relay device according to claim 9, wherein the second transmitter sends the data to the third communication device that includes an output part outputting the data by image or voice.

15. The relay device according to claim 14, wherein the second transmitter sends the data to the third communication device that further includes a counter counting receiving times which the data is received from the relay device; and the output part further outputs the receiving times.

16. The relay device according to claim 14, wherein the second transmitter sends the data to a smartphone or a cellphone as the third communication device.

* * * * *